(12) United States Patent
Hornbostel

(10) Patent No.: US 8,386,182 B2
(45) Date of Patent: Feb. 26, 2013

(54) METHOD FOR ELECTROMAGNETIC PROSPECTING WAVEFORM DESIGN

(75) Inventor: Scott C. Hornbostel, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 228 days.

(21) Appl. No.: 12/935,193

(22) PCT Filed: Mar. 25, 2009

(86) PCT No.: PCT/US2009/038251
§ 371 (c)(1),
(2), (4) Date: Sep. 28, 2010

(87) PCT Pub. No.: WO2009/158052
PCT Pub. Date: Dec. 30, 2009

(65) Prior Publication Data
US 2011/0087435 A1    Apr. 14, 2011

Related U.S. Application Data

(60) Provisional application No. 61/132,968, filed on Jun. 24, 2008.

(51) Int. Cl.
*G01V 1/40* (2006.01)
(52) U.S. Cl. .......................................................... 702/13
(58) Field of Classification Search ....................... 702/13
See application file for complete search history.

(56) References Cited

U.S. PATENT DOCUMENTS

| | | | |
|---|---|---|---|
| 5,357,253 A | 10/1994 | Van Etten et al. | |
| 6,842,006 B2 | 1/2005 | Conti et al. | |
| 7,023,213 B2 | 4/2006 | Nichols | |
| 7,109,717 B2 | 9/2006 | Constable | |
| 7,116,108 B2 | 10/2006 | Constable | |
| 7,126,338 B2 | 10/2006 | MacGregor et al. | |
| 7,272,503 B2 | 9/2007 | Strack et al. | |
| 7,337,064 B2 | 2/2008 | MacGregor et al. | |
| 7,362,102 B2 | 4/2008 | Andreis | |
| 7,477,160 B2 | 1/2009 | Lemenager et al. | |
| 7,539,279 B2 | 5/2009 | Lu et al. | |
| 7,542,851 B2 | 6/2009 | Tompkins | |
| 7,659,721 B2 | 2/2010 | MacGregor et al. | |
| 2004/0108854 A1* | 6/2004 | Nichols .......................... | 324/348 |

(Continued)

FOREIGN PATENT DOCUMENTS

| WO | WO 2005/117326 | 12/2005 |
|---|---|---|
| WO | WO 2006/082372 | 8/2006 |

(Continued)

OTHER PUBLICATIONS

MacGregor, L.M. (1997), "Electromagnetic investigation of the Reykjanes Ridge near 58° North," Ph.D. Dissertation, Cambridge, pp. 84-856.

(Continued)

*Primary Examiner* — Aditya Bhat
(74) *Attorney, Agent, or Firm* — ExxonMobil Upstream Research Company Law Dept.

(57) ABSTRACT

A waveform design method is presented for controlled source electromagnetic surveying. A desired source spectrum (82) is specified based on a desired resistivity depth image resolution (81) with spectral amplitudes determined by expected noise levels (83). Techniques are disclosed for designing a source waveform to match the desired source spectrum. When better resolution is desired at a target zone, this leads to a required clustering of frequency components. A modulated waveform can be used to provide this clustering of frequency components.

17 Claims, 11 Drawing Sheets

U.S. PATENT DOCUMENTS

| | | | |
|---|---|---|---|
| 2004/0112594 A1* | 6/2004 | Aronstam et al. | 166/249 |
| 2006/0186887 A1 | 8/2006 | Strack et al. | |
| 2007/0177705 A1* | 8/2007 | Lu et al. | 375/377 |
| 2007/0288211 A1 | 12/2007 | MacGregor et al. | |
| 2008/0068020 A1* | 3/2008 | Tompkins | 324/335 |

FOREIGN PATENT DOCUMENTS

| | | | |
|---|---|---|---|
| WO | WO 2007/008559 | | 1/2007 |
| WO | WO 2007/046952 | | 4/2007 |
| WO | WO2007046952 | * | 4/2007 |
| WO | WO 2007/079562 | | 7/2007 |

OTHER PUBLICATIONS

Chave, A.D. et al. (1991), "Electromagnetic Methods in Applied Geophysics", Society of Exploration Geophysicists, Chpt. 12, v. 2, pp. 931-966.

Constable, S. (1996), "Marine controlled-source electromagnetic sounding 2. The PEGASUS experiment", *J. Geophs. Res.* 101, pp. 5519-5530.

Constable, S. (2007), "Seafloor Electromagnetic Methods Consortium", Institute of Geophysics and Planetary Physics, Scripps Institution of Oceanography, pp. 1-7.

Constable, S. et al. (2006), "Marine Controlled Source EM Imaging of a Crustal Magma Chamber", 18$^{th}$ IAGA WG 1.2 Workshop in Electromagnetic Induction in the Earth, 4 pgs.

Duncan, P.M. et al. (1980), "The development and applications of a wide band electromagnetic sounding system using a pseudo-noise source", *Geophysics* 45, pp. 1276-1296.

Eidesmo, T. et al. (2002), "Sea Bed Logging (SBL), a New Method for Remote and Direct Identification of Hydrocarbon Filled Layers in Deepwater Areas," *First Break* 20(3), pp. 144-152.

Ellingsrud, S. et al. (2002), "Remote sensing of hydrocarbon layers by seabed logging (SBL): Results from a cruise offshore Angola", *The Leading Edge*, pp. 972-982.

Helwig S.L. et al. (1999), "The VIBR OTEM method", SEG Annual Meeting Extended Abstracts, pp. 283-285.

Jackson, J.D. (1962), "Classical Electrodynamics", John Wiley & Sons, pp. 222-225.

MacGregor, L.M. (1997), Electromagnetic investigation of the Reykjanes Ridge near 58 North, Ph.D. Dissertation, Cambridge, pp. 84-86.

MacGregor, L. et al. (2001), "Electrical Resistivity Structure of the Valu Fa Ridge, Lau Basin, from Marine Controlled-Source Electromagnetic Sounding", *Geophy. J. Int.* 146, pp. 217-236s.

Mittet, R. et al. (2007), "Shaping optimal transmitter waveforms for marine CSEM surveys", SEG 2007 Annual Meeting, pp. 539-543.

Nekut, A.G. et al. (1989), "Petroleum Exploration Using Controlled-Source Electromagnetic Methods", *Proceedings of the IEEE* 77(2), pp. 338-362.

Spies, B. (1989), "Depth of investigation in electromagnetic sounding methods", *Geophysics* 54(7), pp. 872-888.

West, G.F. et al. (1987), Physics of Electromagnetic Induction Exploration Method in Electromagnetic Methods in Applied Geophysics, Society of Exploration Geophysicists, v. 2, pp. 5-45.

*International Search Report and Written Opinion*, dated May 18, 2009, PCT/US2009/38251.

* cited by examiner

METHOD FOR ELECTROMAGNETIC PROSPECTING WAVEFORM DESIGN

CROSS-REFERENCE TO RELATED APPLICATIONS

This application is the National Stage entry under 35 U.S.C. 371 of PCT/US2009/038251 that published as WO 2009/158052 and was filed on 25 Mar. 2009 which claims the benefit of U.S. Provisional Application No. 61/132,968, filed on 24 Jun. 2008, each of which is incorporated by reference, in its entirety, for all purposes.

FIELD OF THE INVENTION

This invention relates generally to the field of geophysical prospecting and, more particularly, to controlled source electromagnetic ("CSEM") surveys of subsurface formations. Specifically, the invention is an improved method for designing source waveforms for generating CSEM fields.

Controlled-source electromagnetic geophysical surveys use man-made sources to generate electromagnetic fields to excite the earth, and deploy receiver instruments on the earth's surface, on the seafloor, in the air, or inside boreholes to measure the resulting electric and magnetic fields, i.e., the earth's response to the source excitation. FIG. 1 illustrates the basic elements of an offshore CSEM survey. A vessel tows a submerged CSEM transmitter 11 over an area of subseafloor 13. The electric and magnetic fields measured by receivers 12, typically located on the seafloor 13, are then analyzed to determine the electrical resistivity of the earth structures beneath the surface or seafloor. This technology has been applied for onshore mineral exploration, oceanic tectonic studies, and offshore petroleum and mineral resource exploration. There are many publications describing CSEM surveying; see, for example, Ellingsrud et al., *The Leading Edge*, 972-982 (2002).

Electromagnetic (EM) fields are generated by the transmitter injecting current of a chosen low-frequency periodic waveform into the earth or seawater/seafloor. For inland and airborne CSEM surveys, measurements are usually made in the frequency range of 0.1 Hz to 50 kHz. Because of the low resistivity of the seafloor, offshore CSEM surveys are usually operated in a low frequency range (0.01 Hz to 100 Hz) to achieve sufficient exploration depth. The shape of the transmitted waveform determines its frequency spectrum. In other words, the transmitter waveform controls the frequency content, distribution and relative amplitudes of the component frequencies. This follows from Fourier analysis in which any function can be expressed as a series of sine or cosine functions of different frequencies. The less the function resembles a sinusoid, the more terms, and hence the more frequencies, that are needed in the Fourier expansion to give a good approximation of the function. The lower frequencies penetrate deeper beneath the earth's surface than the higher frequencies.

In current surveys, the transmitter is flown above the earth's surface by an aircraft, or towed by a vessel only once along each survey line, due to the high cost of operating the source aircraft or vessel. Because the earth contains electrical structures at all depths, the use of multiple source frequencies is highly desirable so that a range of depths can be probed using only one source tow. Therefore, in order to acquire data efficiently and satisfy survey objectives as closely as possible, it is desirable that the transmitter waveform have certain features. Its frequency spectrum should have multiple frequencies spread out over a frequency range (bandwidth) large enough to probe the depth range of interest.

A variety of waveforms are available for use. The simplest one is a sinusoidal wave, but this contains only one frequency. The square wave is a simple and currently widely-used waveform, especially the symmetric square wave shown in FIG. 2A which has the same time duration for positive and negative polarities. This simple waveform has been used in CSEM work because it is easy to generate from a technological standpoint and it provides a useful range of frequencies; see L. M. MacGregor, *Electromagnetic investigation of the Reykjanes Ridge near 58° North*, Ph.D. Dissertation, Cambridge, 84-86 (1997). The symmetric square wave has only odd harmonics in its spectrum, and the harmonic amplitudes decrease quickly with increasing frequencies as shown in FIG. 2B. The relative amplitudes and frequency spacing are fixed for a square wave of given frequency and these spectral components are not explicitly tied to CSEM imaging requirements or expected noise levels.

The abscissa values for FIG. 2A are normalized such that the period of the waveform is unity, and the ordinate values are normalized to have unit amplitude. The frequency values of the spectrum shown in FIG. 2B are also normalized by dividing by the fundamental frequency, i.e., the reciprocal of the repetition period of the waveform. The same type of normalization is used for all waveforms and spectra in the background material herein.

A special waveform was designed by Constable and Cox to have the same relatively large amplitude (power transmitted at that frequency) for the first and third harmonics (*J. Geophs. Res.* 101, 5519-5530 (1996)). This "Cox" waveform and its spectrum are shown in FIGS. 3A and 3B, respectively. Unfortunately the frequency band consists of two strong harmonics and scattered high frequencies, and amplitudes and frequency spacing are fixed for a Cox wave of given frequency; i.e. any Cox waveform has two strong peaks at normalized frequencies 1 and 3. The spectral components are not tied to CSEM imaging requirements or expected noise levels similar to the square-wave case.

Pseudo-random binary sequence ("PRBS") waveforms are well-known, and can provide more useful frequencies that span a wider frequency band. See, for example, P. M. Duncan et al., *Geophysics* 45, 1276-1296 (1980); and S. L. Helwig, et al., *SEG Annual Meeting Extended Abstracts*, 283-285 (1999). FIG. 4A shows a PRBS generated by a shift register of degree 4, and FIG. 4B shows its spectrum. Frequencies provided by a PRBS are spaced uniformly on a linear frequency scale with defined amplitudes.

In another waveform design method (Lu et al., U.S. Patent Application Publication 2007/0177705, three to five frequency peaks can be specified with factors of two in frequency spacing (equal log spacing) and roughly equal in amplitude. A tripeak waveform, for example, is illustrated in FIG. 5A with the normalized spectrum in FIG. 5B. As in the previous examples, the frequency spacings and amplitudes are not tied to imaging requirements or expected noise levels.

Current CSEM waveform design as exemplified in the previous discussion is not clearly connected to how the specific frequencies will be needed to produce a resistivity image. Also, the amplitudes at each frequency are not related to expected noise levels. In typical practice, some modeling may be done to find a fundamental frequency that is best able to penetrate to the target depth. This frequency is then selected as the fundamental in some given waveform (e.g., a square wave). The higher frequencies are then completely specified based on the pattern for the chosen waveform (e.g, odd harmonics for the square wave with amplitudes falling off as 1/f).

When specialized designs are considered, a typical current practice is to try to balance amplitudes over several frequencies (e.g., tripeak or Cox). It is not clear why one would want to do this. Another suggestion sometimes made is that higher frequencies should be boosted in amplitude with respect to the fundamental to overcome skin depth losses (e.g., PCT Patent Application Publication WO 2006/082372 A1; "Optimum Signal for Sea Bed Logging").

What is needed is a method for designing a CSEM waveform in which the desired imaging result is related to a related desired frequency spectrum, and wherein the spectral amplitudes are also determined by considering how the different spectral components are used in imaging and how the amplitudes relate to expected noise levels. Once the spectral content is better defined, the method should provide a way to produce a waveform (or set of waveforms) that can best match this desired spectrum. The present invention satisfies these needs.

SUMMARY OF THE INVENTION

In one embodiment, the invention is a method for prospecting for hydrocarbons in a subsurface region using the results of a controlled-source electromagnetic survey, comprising:

(a) obtaining measured electromagnetic data from a survey of the subsurface region, said survey having used at least one source waveform that was selected or designed by steps comprising:

(i) defining a plurality of resolvable depth units within the subsurface region;

(ii) for each depth unit, calculating an optimal frequency for penetrating to that depth;

(iii) estimating noise levels at each optimal frequency;

(iv) determining a minimum source amplitude at each optimal frequency in consideration of the estimated noise; and (v) selecting or designing at least one source waveform whose frequency spectrum, or combined frequency spectra if more than one source waveform, contains all optimal frequencies determined in (ii), within a preselected tolerance, with associated amplitudes substantially the same as or greater than the minimum amplitudes determined in (iv);

(b) constructing an earth model of the subsurface region using electromagnetic data measured in the survey; and (c) predicting hydrocarbon potential of the subsurface region at least partly from the earth model.

The earth model can be a resistivity model because the resistivity of a hydrocarbon deposit typically is greater than that of surrounding background regions.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
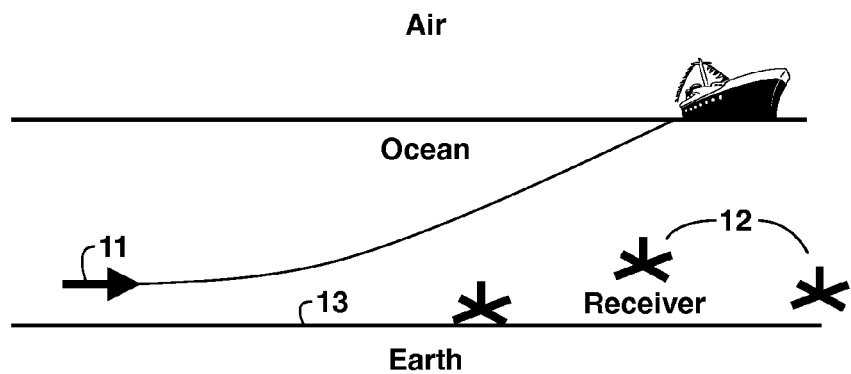
FIG. 1 is a schematic diagram illustrating offshore controlled source electromagnetic surveying using a horizontal electric dipole source.
Figure 2A:
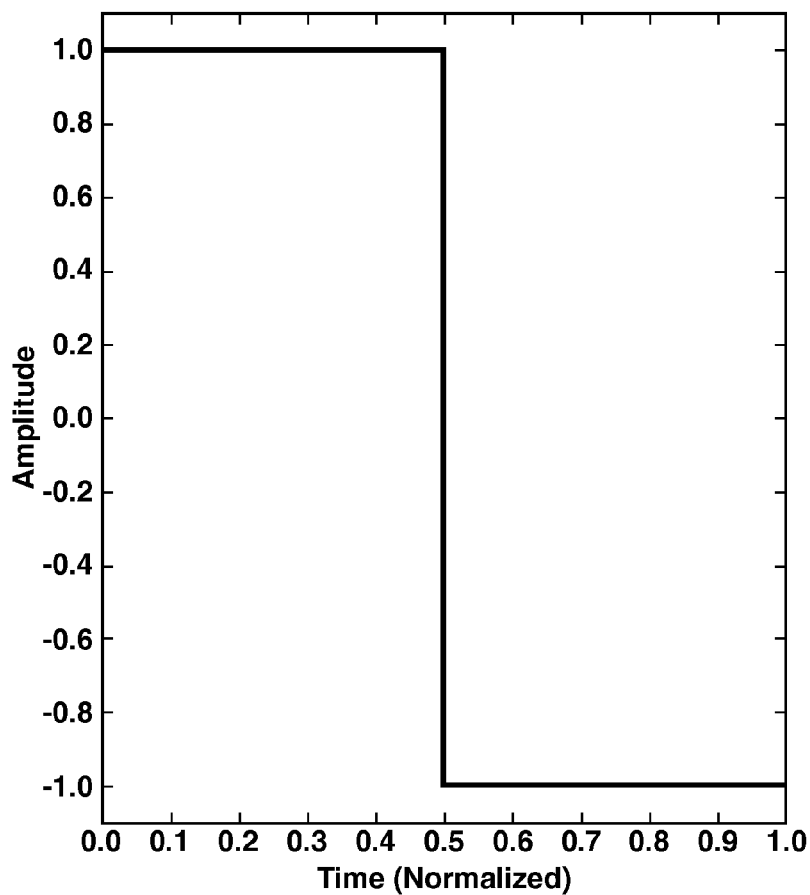
FIGS. 2A and 2B are graphs of a symmetric square wave and its frequency spectrum, respectively.
Figure 2B:
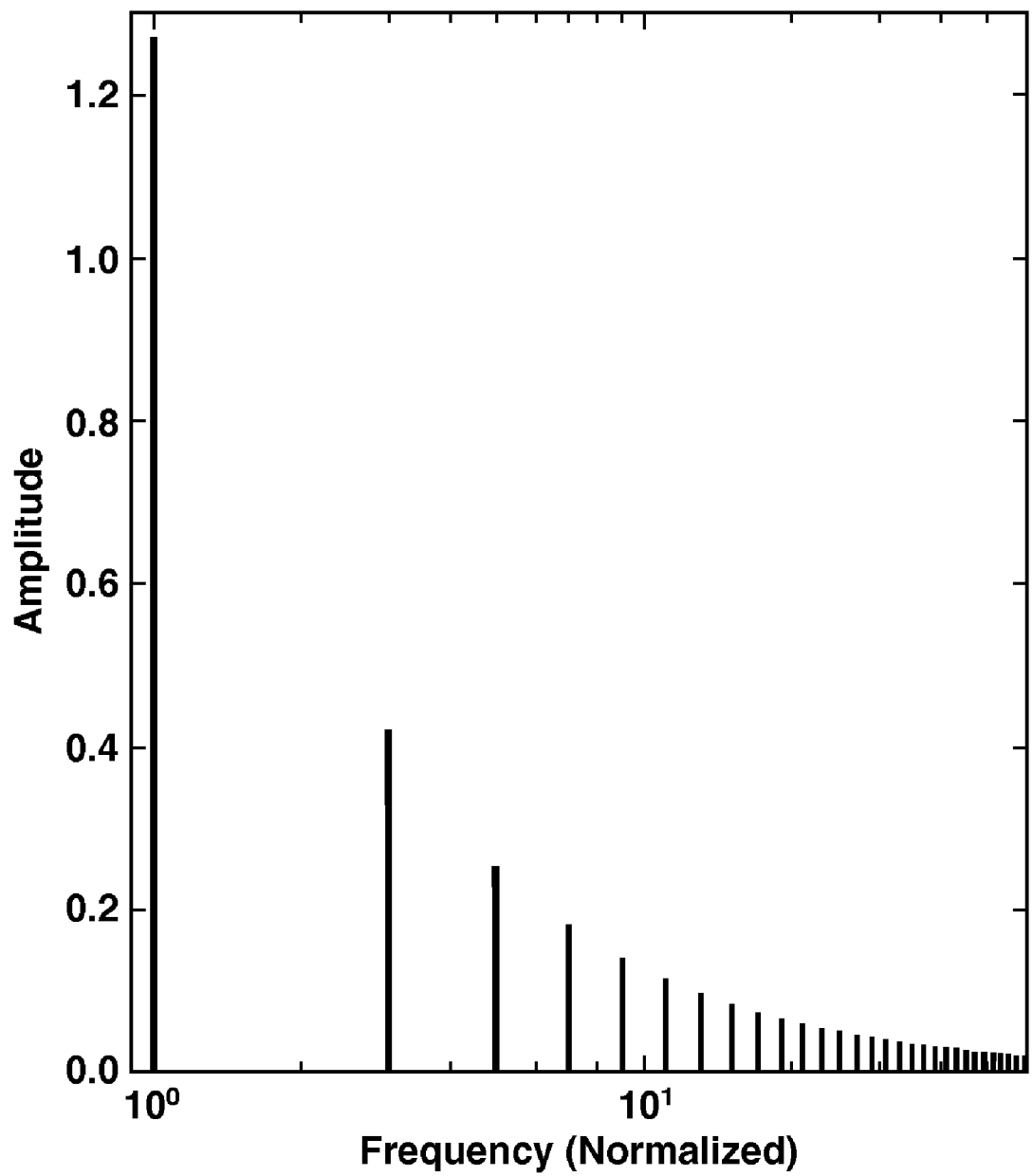
Figure 3A:
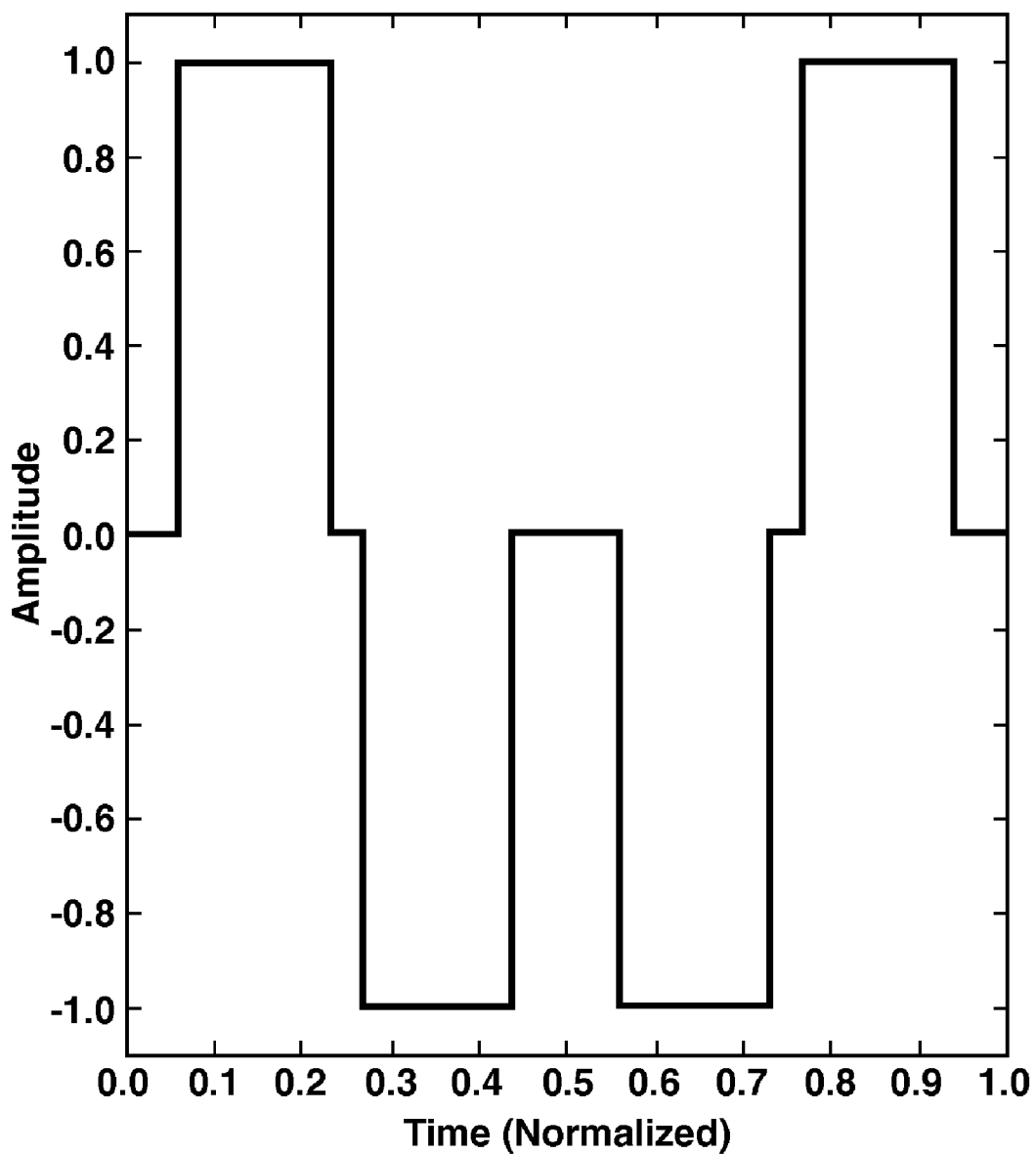
FIGS. 3A and 3B are graphs of a waveform designed for CSEM surveying by Cox and Constable, and the waveform's frequency spectrum, respectively.
Figure 3B:
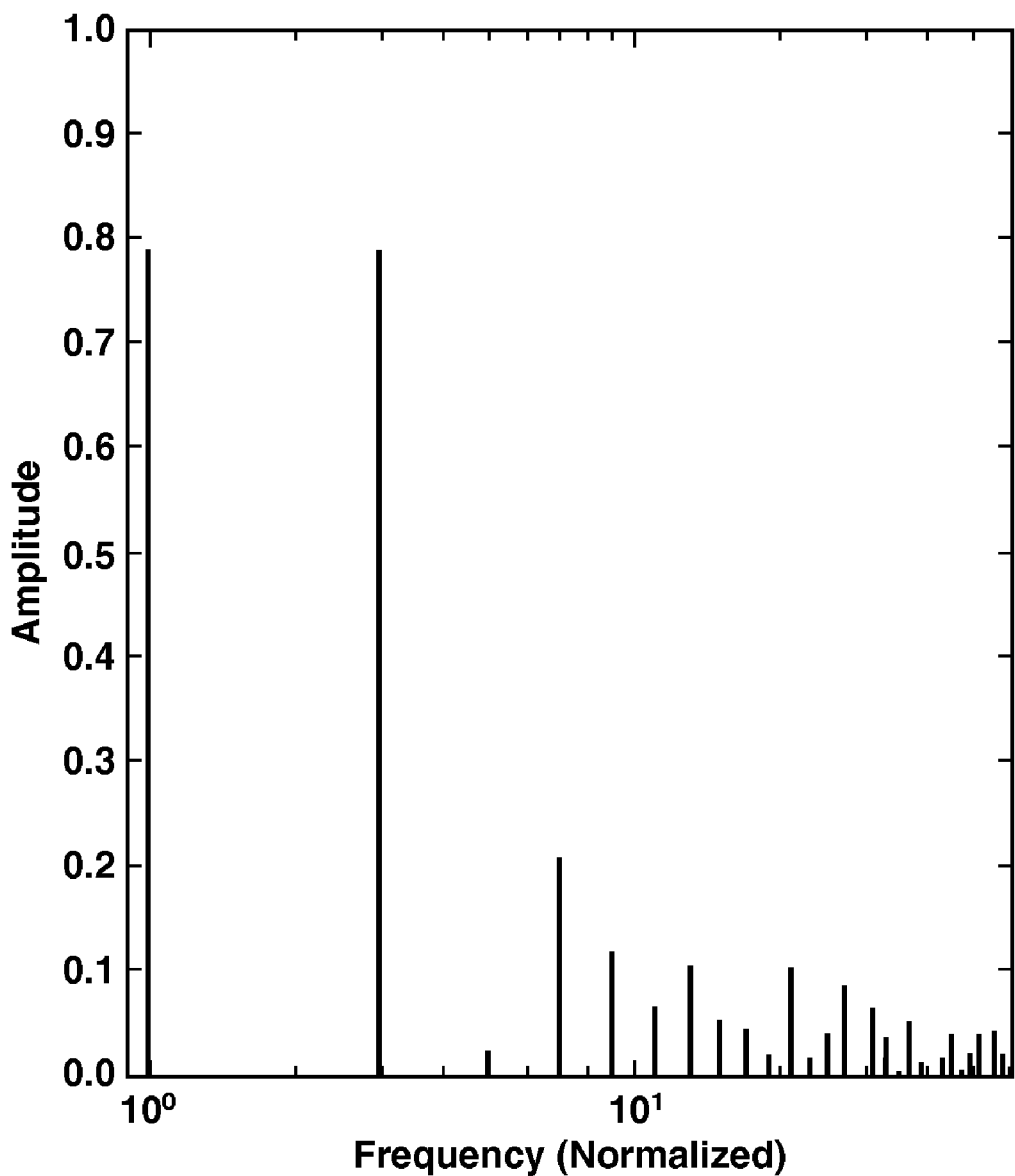
Figure 4A:
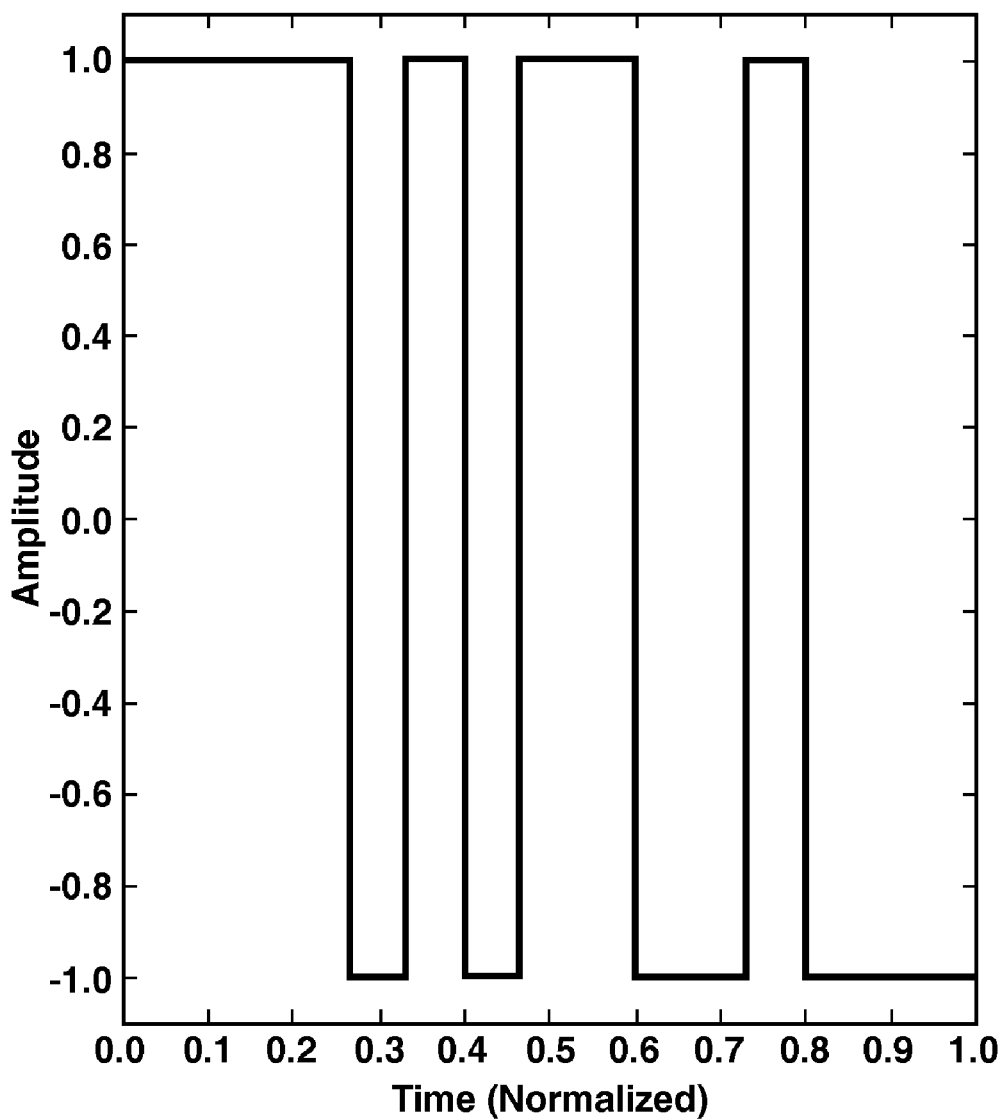
FIGS. 4A and 4B are graphs of a binary-coded waveform using a pseudo-random binary sequence of degree four, and its frequency spectrum, respectively.
Figure 4B:
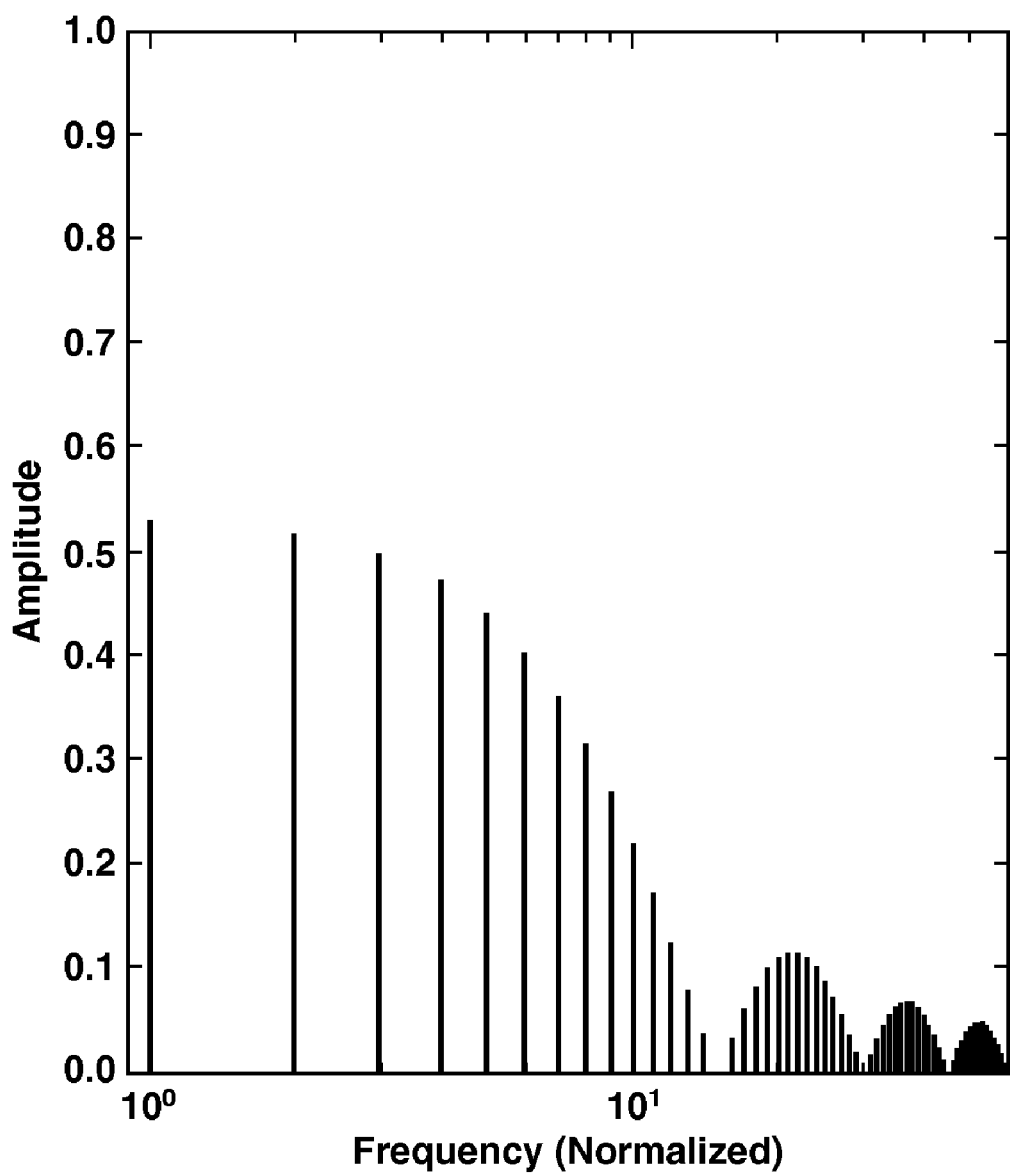
Figure 5A:
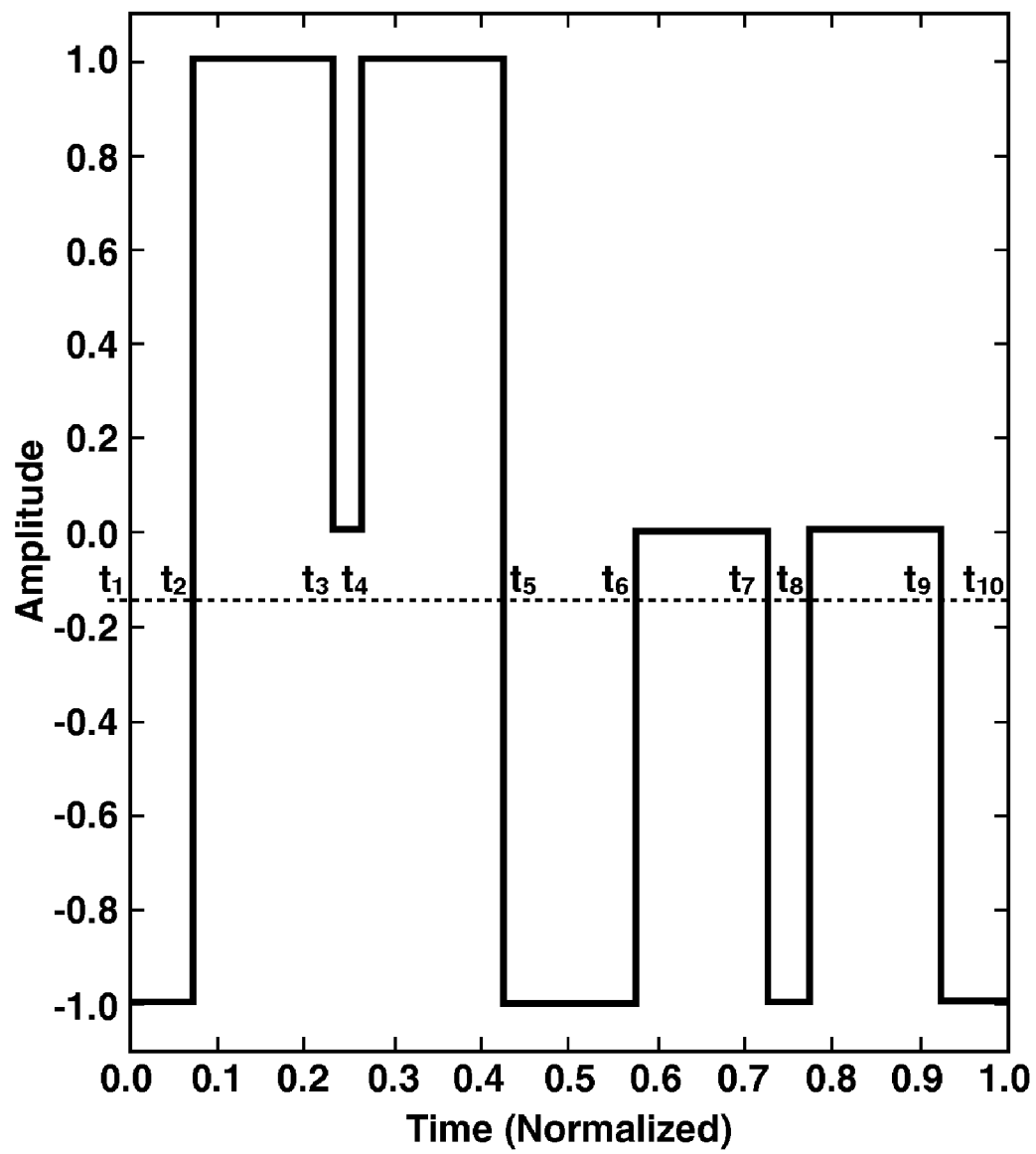
FIGS. 5A and 5B are graphs of the tripeak waveform and its frequency spectrum, respectively.
Figure 5B:
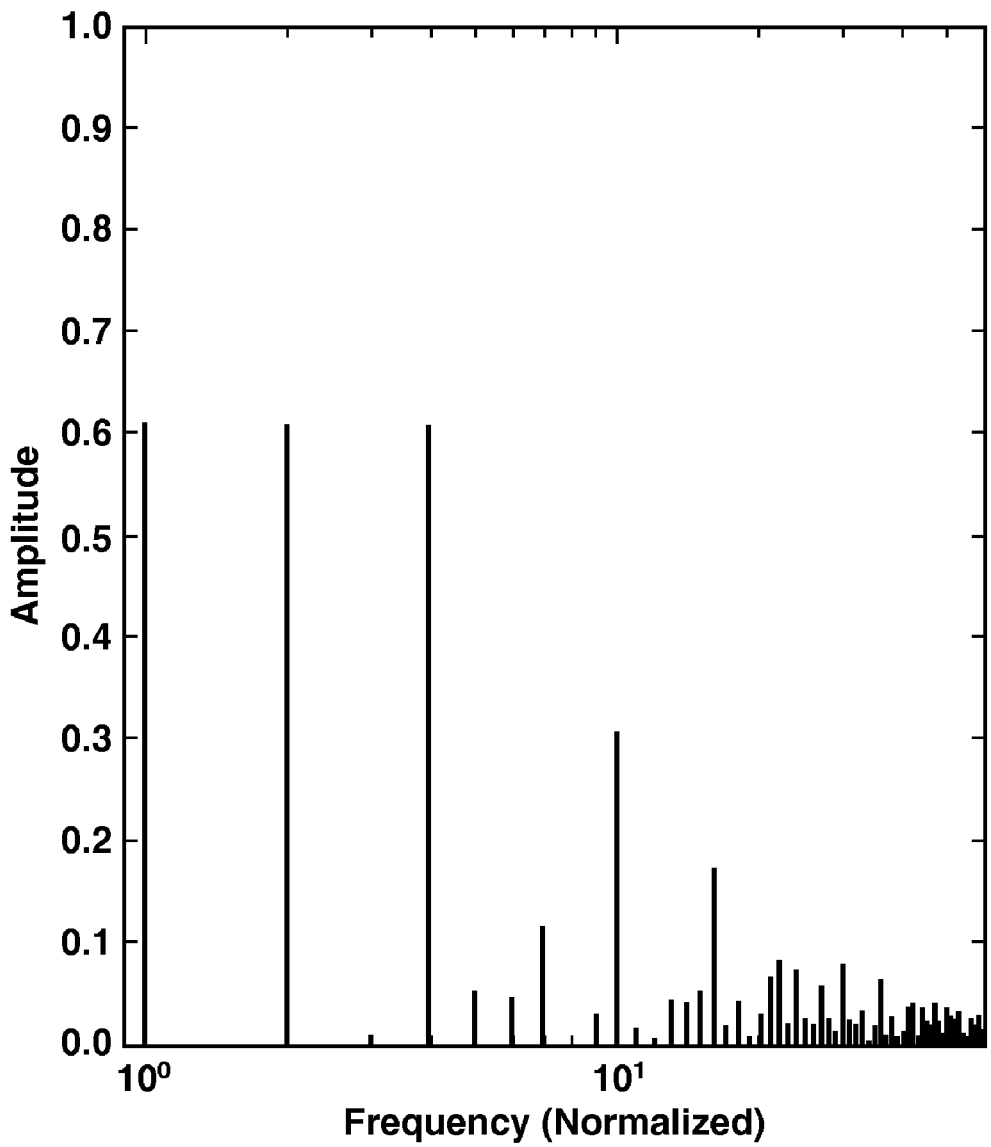
Figure 6:
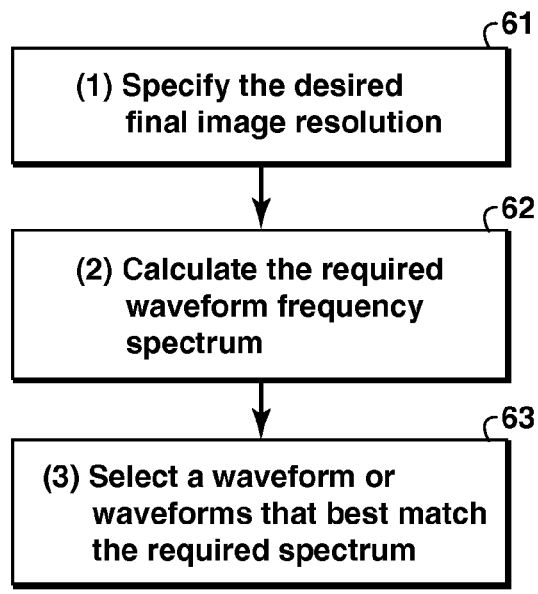
FIG. 6 is a high-level flowchart of the CSEM waveform design method.

Basic steps of the current inventive method are shown in the flow chart of FIG. 6. In step 61, the desired final depth resolution after imaging is specified. At step 62, the required frequencies to achieve this resolution are calculated. The required relative amplitudes of these frequency components can be estimated by considering expected noise levels and by understanding how these frequency components will be processed and used in the inversion. Finally, at step 63, an actual waveform that best matches the desired spectrum is determined.

For a typical case in which one desires (step 61) better resolution at depths near the target zone compared with the surrounding earth, a particular type of spectrum (step 62) is required. This spectrum would have a dense band of frequencies that relate to the target while other, more sparsely spaced frequencies are required at higher and lower frequencies to characterize the surrounding medium. A disclosure of the present invention is that this class of desired resolution patterns can be implemented (step 63) with a modulated waveform with the possible need to add a very low frequency waveform.

Figure 7:
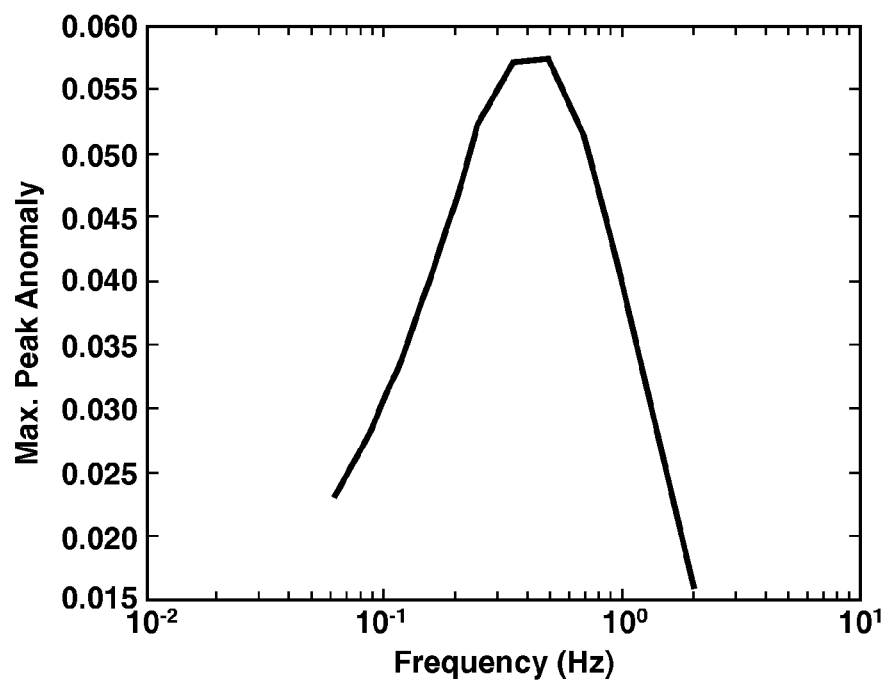
FIG. 7 is an example of a frequency sweep illustrating peak sensitivity to a particular depth as a function of frequency.

FIG. 7 is an example of a frequency sweep showing peak sensitivity to a particular depth as a function of frequency. This plot shows the largest relative anomaly that would be observed when a resistive body is added at the specified depth. The relative anomaly is calculated by modeling the acquired CSEM data for cases with and without the resistivity change at the depth under study. The difference between these two cases is then normalized by dividing by the amplitude of the total field from the case without the resistivity change. This is the relative anomaly and its largest value over all offsets with field values above the noise threshold is plotted at the given frequency.

These frequency sweeps (e.g., FIG. 7) will generally peak at a particular frequency since two factors cause loss of sensitivity at high and low frequencies, respectively. One factor, skin depth losses, will cause signal decay and thus loss of sensitivity at the higher frequencies. At the lower frequencies, a second factor causes loss of sensitivity. At these lower frequencies, a larger portion of the earth is sampled (a function of the larger wavelength and reduced attenuation) and the resistivity change becomes a relatively less significant portion of this total volume. The optimal frequency typically has a value such that its corresponding skin depth is between one-half and one times the depth under investigation.

The skin effect phenomenon (J. D. Jackson, *Classical Electrodynamics*, John Wiley & Sons, 222-225 (1962); B. R. Spies, *Geophysics* 54, 872-888 (1989)) is well known for low-frequency EM fields. The skin depth gives the depth at which a plane-wave EM field falls to 1/e in amplitude. The modeling approach described above with FIG. 7 gives a preferred but time-consuming method for determining the optimal frequency at each depth of interest. A simplified way to approximate the optimal frequencies for these depths is to select frequencies that correspond to the skin depth at each depth. All such ways of estimating optimal frequency are within the scope of the present invention.

Using the skin-depth formula (page 225 in Jackson), this gives a value of $$f_{opt} = \rho * \left(\frac{500}{D}\right)^2$$

where the optimal frequency $f_{opt}$ is related to the average overburden vertical resistivity $\rho$ and the depth D (in meters). Using either approach, a set of desired frequencies can now be assembled that corresponds with a set of depths of interest.

Figure 8:
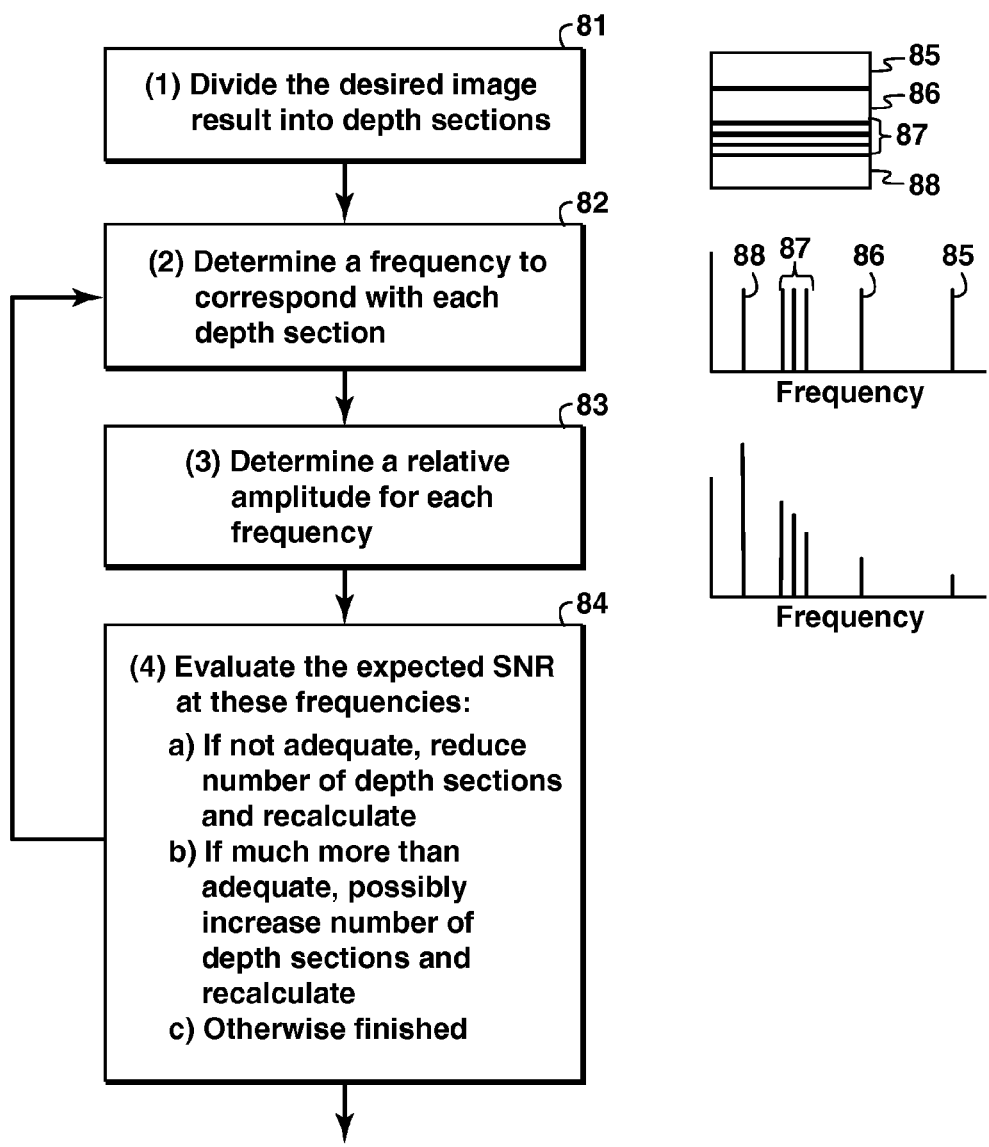
FIG. 8 is a flowchart illustrating a method to calculate a required waveform spectrum (an expansion of FIG. 6, step 2)

In one embodiment of the present invention, the required waveform frequency spectrum (FIG. 6, step 62) is calculated as outlined in the flow chart of FIG. 8. In step 81, the desired resistivity image is divided into depths that one would like to resolve. As an example, one might begin by assuming that equal resolution with depth is desirable. This implies that frequencies with equally spaced skin depths are wanted. Since skin depth is proportional to $1/\sqrt{f}$ this equates to a "log spacing" with an equal number of components in each frequency decade.

For another example, the survey designer may desire better resolution at the target zone. This implies a set of frequencies in a narrow band where all are sensitive to this target depth (in somewhat different ways). For example, 500 m resolution in the shallow and deep portions of the image may be satisfactory, while near the target 200 m resolution is desirable. An easy method for selecting desired waveform frequencies is to take the optimal frequency for each "resolvable unit" (e.g., every 500 m above and below the target, and every 200 m within the target zone). This might lead, for example, to a few high frequencies to characterize the overburden, several frequencies (maybe 3-5) to characterize the target zone, and maybe one or two lower frequencies to characterize the deeper background. FIG. 8 illustrates this second survey design approach. Six depth units are selected. The subsurface is fully partitioned, without gaps, from some highest level, which could be for example the seafloor, down through a predicted target zone, and extending one unit below the target zone. Three thin units 87 are devoted to resolving the expected target zone, with the space above the target divided into two depth units 85 and 86. Depth unit 88 is selected just below the expected target to frame it better in the imaged results.

FIG. 8, step 82, illustrates an embodiment of the invention in which this one-to-one correspondence between the desired depth image and the required frequency components is selected. The one-to-one correspondence is a simple way to specify the spectrum but other methods could be considered. One might, for example, solve for the m frequencies that best resolve a model of n layers using some optimization approach. The reference numbers in the corresponding example frequency spectrum match up with the depth units in the illustration of step 81. The optimal frequency for each depth unit is preferably determined, for example, using the method illustrated in FIG. 7. A small change in the resistivity of the particular depth unit will lead to a relative change in the recorded data. This relative change is a function of frequency as illustrated in FIG. 7. The frequency that produces largest relative data change is optimally sensitive to the particular depth. However, as used herein, the term optimal frequency for an associated depth unit will be understood to also include sub-optimal frequencies. Thus, a frequency calculated using the skin-depth formula will also be considered optimal for purposes herein without further refinement such as is provided by a sensitivity graph such as FIG. 7. In the example of FIG. 7, the frequency that corresponds to one skin depth is about 0.3 Hz, which is close to the frequency of about 0.4 Hz that might be the preferred pick from the modeled peak of FIG. 7.

In FIG. 8, step 83, the relative amplitudes are determined for the given frequency components. To find these amplitudes, one must consider the effects of background noise and of the way in which the inversion process will use the frequencies. To begin with, each frequency has a corresponding depth for which it provides the best information. In the inversion process, the various frequencies are providing information preferentially at their most sensitive depths. Since these depths represent about one skin depth for any given frequency, there is no need to compensate for skin-depth losses in the required relative amplitudes.

What factors do matter? To begin with, the magnetotelluric (MT) noise typically decays as 1/f. Based on this, the desired initial amplitudes should also decay as 1/f to give the same SNR at each frequency where MT noise dominates. The MT noise tends to dominate at the lower frequencies. At relatively higher frequencies, the noise may be dominated by instrument or other environmental noises that are often relatively flat with frequency implying initial amplitudes that are relatively flat. There are other potential factors affecting the required signal amplitudes. Another such issue deals with the way recorded data are transformed into the frequency domain. If the spectral components are calculated over a fixed time window, this gives better noise cancellation at the higher frequencies since the random noise is reduced based on the number of cycles in the window. This noise cancellation (stacking) factor gives an SNR boost that goes as $\sqrt{f}$. Combining this with the MT decay of 1/f gives a desired initial spectrum that falls off as $f^{-3/2}$ at low frequencies. At higher frequencies the desired initial spectrum would fall as $f^{-1/2}$ due to the stacking factor. Other factors can further modify this function. For one, the effect of attenuation of MT noise through the water layer will preferentially reduce the higher frequencies. For another, there may be other, non MT, noise sources such as from ocean current flow that may have a different spectral content. Balancing these various effects leads to a step 83 choice of 1/f as a simple approximation for desired relative signal amplitudes in some embodiments of the present inventive method.

The 1/f decay is for "relative" amplitudes. The absolute amplitude is also important so that the frequency components will have adequate SNR. Absolute amplitude can be increased by either using a more powerful source or by reducing the number of frequency components in the spectrum. FIG. 8, step 84, expresses this evaluation. Typically, one would have an estimate for the MT noise floor for a given water depth. If, after specifying the relative amplitudes, the SNR is inadequate for a given source, it would be necessary to reduce the number of frequency components so that the remaining components will have more energy. (The total energy is fixed for a given waveform of 1's and −1's of fixed length.) If, on the other hand, the SNR is much more than adequate, one might consider adding more frequency components to get better resolution.

Once the desired spectrum is specified, it can be approximately matched (FIG. 6, step 63) using either some explicit waveform design or using an optimization approach (e.g., R. Mittet and T. Schaug-Pettersen, "Shaping optimal transmitter waveforms for marine CSEM surveys," SEG 2007 Annual Meeting, Expanded Abstracts, 539-543). The choices of waveform(s) will depend upon the desired spectrum. For some cases where it is desired to image a wide range of depths, one might choose an appropriate square wave or tripeak, for example. For the case where better resolution is desired at a particular narrower range of depths, one might choose a waveform where frequency components are clustered. A possible explicit design that has several closely spaced components about a given frequency is the modulated square-wave waveform.

Figure 9A:
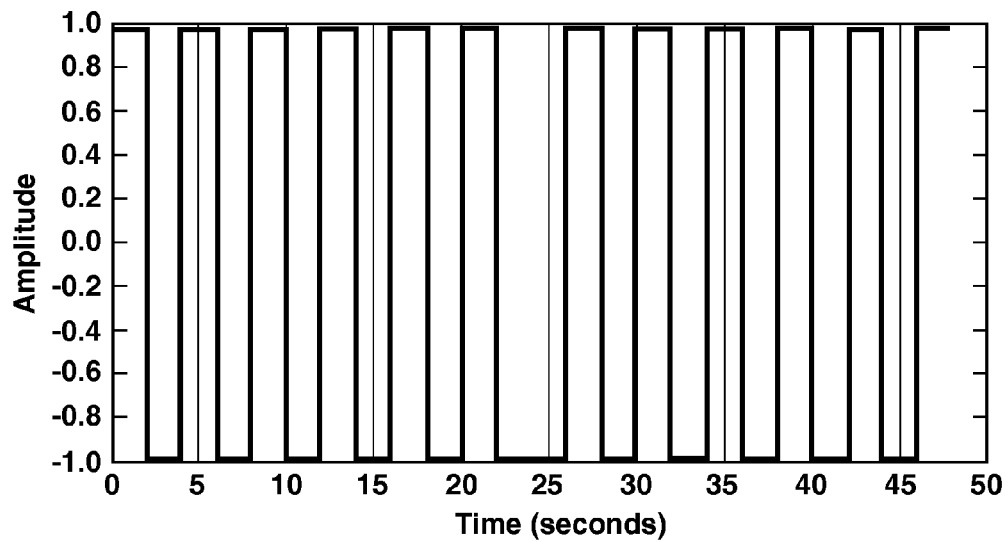
FIGS. 9A and 9B are graphs of a modulated square wave and its amplitude spectrum, respectively.
Figure 9B:
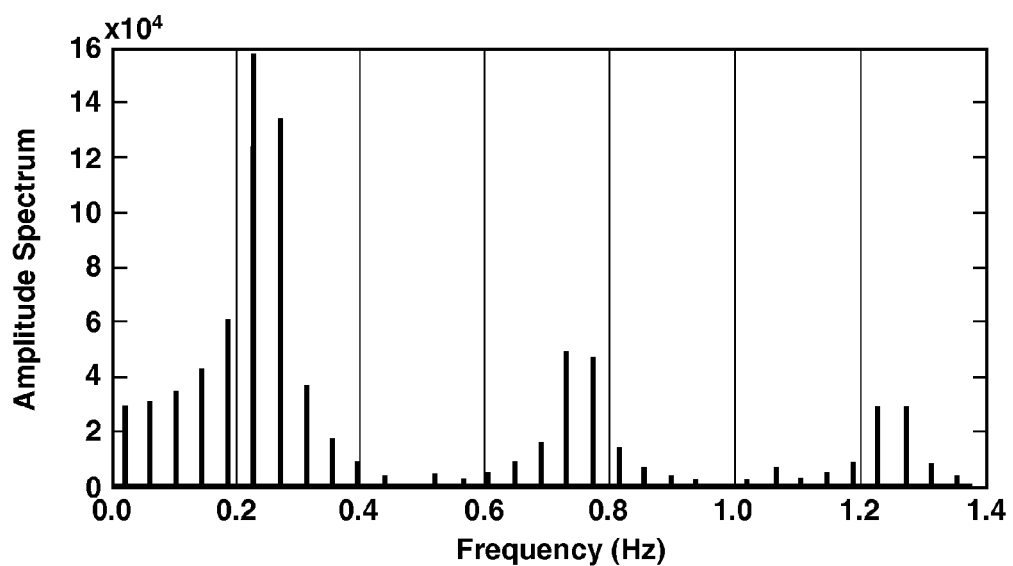

FIG. 9A gives an example of a modulated square wave where one begins with a low frequency square wave that is 48 seconds long having a spectrum with about 0.04 Hz spacing between the harmonics. This long square wave is multiplied (modulated) by a second square wave with 4 second period which shifts the closely spaced components up to 0.25 Hz (FIG. 9B). By modulating a square wave with another square wave, one is assured of having all 1's and −1's and therefore maximum total energy. Different shaping of the harmonics etc. could be achieved if either the initial or modulating signal were some other waveform (e.g., tripeak). Such alternatives are preferably evaluated for a best match in any given case.

The modulated square wave is good for depths near the target and also above the target using the higher frequency harmonics. If one also wants to resolve some depths below the target, one or more very low frequencies may be added. If one or two layers just below the target will suffice, the modulated form can still be used with a few extra layers. If this is not adequate, a very low frequency square wave may be added, possibly alternating with the modulated square wave in sequential time windows as described by Lu et al. in PCT Patent Application Publication No. WO2007/046952.

Other explicit design methods can also be considered that contain a low frequency along with a band of targeted frequencies. In general, the focus of the choice of waveforms is on the low to moderate frequencies since harmonics are nearly always present with sufficient amplitudes to meet the higher frequency requirements.

An alternate approach to add low frequencies is to add subsequent source lines to the survey tow schedule, perhaps a square wave with fundamental at the very lowest frequency. This may be advantageous in light of the previously discussed need to boost the low frequencies. At the very low frequency, the areal sensitivity pattern may be substantially broader allowing sparser source lines for these extra tow lines.

Another approach to fill in additional frequencies is to add subsequent source lines that cover the same area. These can be repeated lines or additional lines that are orthogonal to the original line orientations (e.g., east-west source lines to complement initial north-south lines). The additional source lines may add low frequencies as mentioned above or may alternately be selected to include interleaved frequencies. The addition of frequencies between existing frequencies will enhance the expected resolution of the method.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for prospecting for hydrocarbons in a subsurface region using the results of a controlled-source electromagnetic survey, comprising:
   (a) obtaining measured electromagnetic data from a survey of the subsurface region, said survey having used at least one source waveform that was selected or designed by steps comprising:
      (i) defining a plurality of resolvable depth units within the subsurface region;
      (ii) for each depth unit, calculating an optimal frequency for penetrating to that depth;
      (iii) estimating noise levels at each optimal frequency;
      (iv) determining a minimum source amplitude at each optimal frequency in consideration of the estimated noise; and
      (v) selecting or designing at least one source waveform whose frequency spectrum, or combined frequency spectra if more than one source waveform, contains all optimal frequencies determined in (ii), within a pre-selected tolerance, with associated amplitudes substantially the same as or greater than the minimum amplitudes determined in (iv);
   (b) constructing an earth model of the subsurface region using electromagnetic data measured in the survey, said constructing being performed using a computer; and
   (c) predicting hydrocarbon potential of the subsurface region at least partly from the earth model.

2. The method of claim 1, wherein the defined depth units partition the subsurface region's depth from surface, or water bottom in a marine environment, to a pre-selected maximum depth.

3. The method of claim 1, wherein the selected or designed at least one source waveform's frequency spectrum, or spectra if more than one source waveform, has associated amplitudes relatively substantially the same as the minimum amplitudes determined in (a)(iv).

4. The method of claim 1, wherein a criterion in selecting or designing a waveform is minimization of amplitudes associated with additional frequencies (other than the optimal frequencies from (a)(ii)) in the frequency spectrum of a selected or designed waveform.

5. The method of claim 1, wherein a predicted target depth zone is partitioned into at least two resolvable depth units in (a)(i).

6. The method of claim 5, wherein the depth units in the target zone are thinner than all depth units above or below the target zone.

7. The method of claim 5, wherein there are at least three resolvable depth units in the target depth zone and they are selected such that the difference between their associated frequencies from one unit to the next is a substantially constant frequency increment.

8. The method of claim 7, wherein at least one source waveform is designed by selecting a first component waveform having a fundamental frequency substantially equal to the substantially constant frequency increment, then modulating the first component waveform with a second component waveform selected to match the modulated frequency spectrum (amplitudes and frequencies) to requirements specified in (a)(v), wherein there are no depth units defined below the target zone.

9. The method of claim 8, further comprising adding a depth unit below the target zone and adding a second source waveform having a fundamental frequency calculated to be optimal for penetrating said depth unit below the target zone.

10. The method of claim 9, wherein said first component waveform is a square wave and said second source waveform is a square wave.

11. The method of claim 1, wherein the optimal frequencies are calculated using the skin-depth formula.

12. The method of claim 1, wherein the optimal frequencies are calculated by modeling.

13. The method of claim 1, wherein the minimum amplitudes for at least a plurality of frequencies are inversely proportional to their corresponding frequencies.

14. The method of claim 1, wherein a plurality of source waveforms are selected or designed and are used in the survey by time alternation along one or more source lines in the survey.

15. The method of claim 1, wherein a plurality of source waveforms are selected or designed and are used in the survey one waveform per survey source line.

16. A method for producing hydrocarbons from a subsurface region, comprising:
 (a) obtaining the results of a controlled source electromagnetic survey of the subsurface region made using a source waveform that was selected or designed using a method as described in claim 1, incorporated herein by reference;
 (b) using the survey results to identify hydrocarbon potential of the subsurface region; and
 (c) in response to a positive determination of hydrocarbon potential, drilling a well into the subsurface region and producing hydrocarbons from it.

17. A method for prospecting for hydrocarbons in a subsurface region using the results of a controlled-source electromagnetic survey, comprising:
 (a) conducting a controlled-source electromagnetic survey of the subsurface region, wherein said survey uses at least one source waveform that was selected or designed by steps comprising:
  (i) defining a plurality of resolvable depth units within the subsurface region;
  (ii) for each depth unit, calculating an optimal frequency for penetrating to that depth;
  (iii) estimating noise levels at each optimal frequency;
  (iv) determining a minimum source amplitude at each optimal frequency in consideration of the estimated noise; and
  (v) selecting or designing at least one source waveform whose frequency spectrum, or combined frequency spectra if more than one source waveform, contains all optimal frequencies determined in (ii), within a pre-selected tolerance, with associated amplitudes substantially the same as or greater than the minimum amplitudes determined in (iv);
 (b) predicting hydrocarbon potential of the subsurface region at least partly from an earth model of the subsurface region constructed using electromagnetic data measured in the survey, the construction of the earth model being performed using a computer.

* * * * *